T. F. RICE.
DIGGER FOR POTATOES, PEANUTS, OR THE LIKE.
APPLICATION FILED APR. 30, 1917.

1,241,883.

Patented Oct. 2, 1917.
2 SHEETS—SHEET 2.

Inventor:
Thomas Francis Rice
by Davis & Simms
his attorneys

UNITED STATES PATENT OFFICE.

THOMAS FRANCIS RICE, OF HENRIETTA, NEW YORK, ASSIGNOR TO THE RICE MANUFACTURING COMPANY, OF ROCHESTER, NEW YORK, A CORPORATION OF NEW YORK.

DIGGER FOR POTATOES, PEANUTS, OR THE LIKE.

1,241,883.  Specification of Letters Patent.  Patented Oct. 2, 1917.

Application filed April 30, 1917. Serial No. 165,369.

*To all whom it may concern:*

Be it known that I, THOMAS FRANCIS RICE, a citizen of the United States, and resident of Henrietta, in the county of Monroe and State of New York, have invented certain new and useful Improvements in Diggers for Potatoes, Peanuts, or the like, of which the following is a specification.

The present invention relates to diggers for potatoes, peanuts, or the like, and more particularly to the type in which a shovel is provided which gathers the potatoes or other articles with the dirt, and conducts such material to an endless conveyer which is agitated for the purpose of separating the dirt from the potatoes or the like, an object of this invention being to provide a construction in which the endless conveyer may be moved with reference to the agitating means, so that the agitating means may be rendered inactive at will.

To this and other ends the invention consists of certain parts and combinations of parts, all of which will be hereinafter described, the novel features being pointed out in the appended claims.

In the drawings:—

Figure 1:
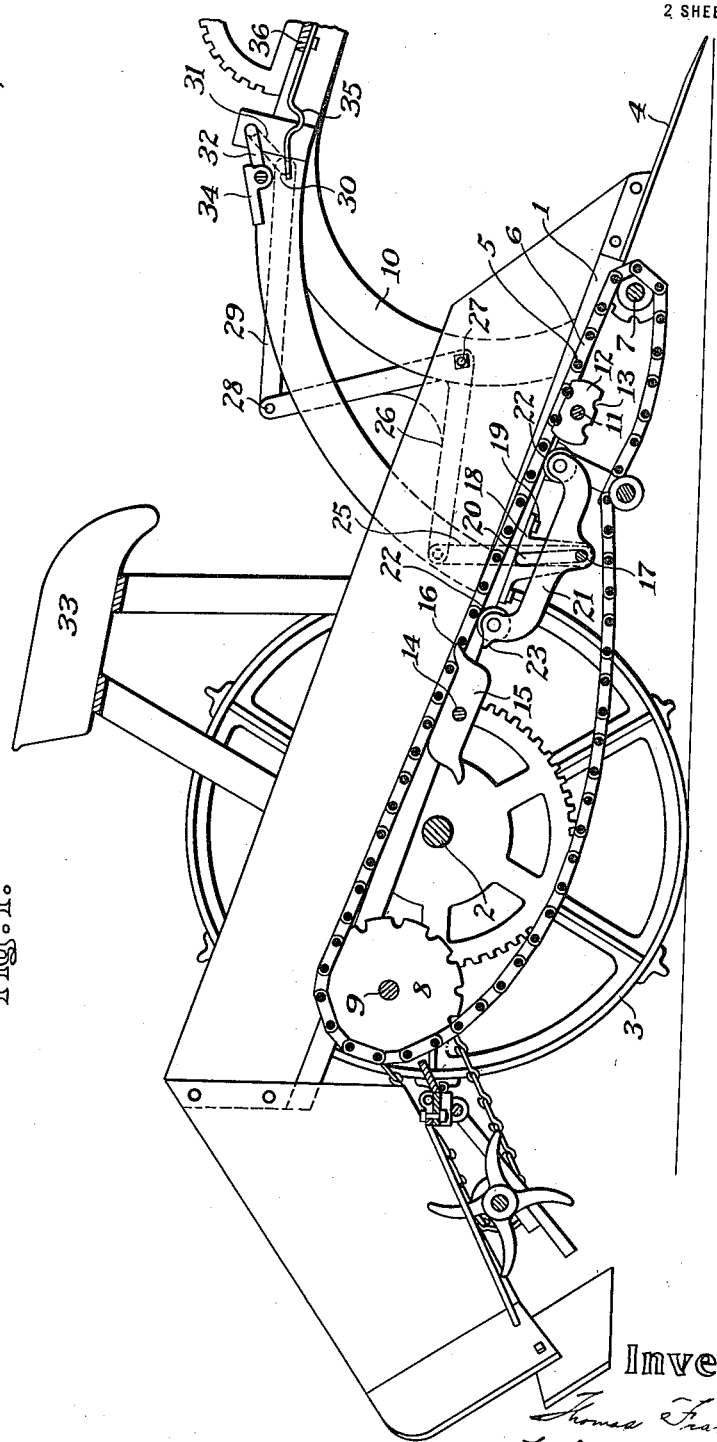
Figure 1 is a vertical section through a machine constructed in accordance with this invention, the machine being shown adjusted for producing the agitation.

The machine herein shown is of the type known in the trade as the "Rice" digger, this type being shown more in detail in Letters Patent #1,131,419, granted March 9, 1915, to John E. Rice as administrator of William H. Rice, deceased. In this type of machine there is employed a pair of side frame pieces 1, supported on an axle 2, on which turns a pair of ground wheels 3. The forward ends of these frame pieces 1 are connected by a shovel 4, and between the frame pieces and in rear of the shovel an endless conveyer operates, said conveyer embodying a plurality of parallel rods 5 connected at their opposite ends by links 6. At its forward end, immediately in rear of the shovel 4, the conveyer is supported on two sprocket wheels 7 mounted on a side piece 1, and the rear end is supported by two sprockets 8 mounted on a shaft 9, which is supported by the side pieces 1. Braces 10 project upwardly and forwardly from the side pieces 1, and have the draft means connected thereto, in a manner which does not enter into the present invention. While the invention has been illustrated in connection with the "Rice" digger, it is apparent that it is capable of being embodied in any digger of a similar type.

Any suitable agitating means may be employed for acting on the endless conveyer. In this instance, two agitating devices are provided. One of these comprises a shaft 11 mounted on the side pieces 1 directly beneath the upper lap of the conveyer, and having two plates 12 mounted thereon. These plates are elongated, and are provided on opposite sides with notches 13 which receive the rods 5 of the conveyer so as to be driven by the conveyer when engaged by the rods and produce the agitation of such conveyer. The other agitating device embodies a shaft indicated at 14, and having two plates 15 mounted thereon of the elongated form, with projections 16 at opposite ends of each plate for engagement by the rods 5 of the conveyer to cause the elevation of a portion of the conveyer, and a sudden dropping thereof to produce the agitating action.

Figure 2:
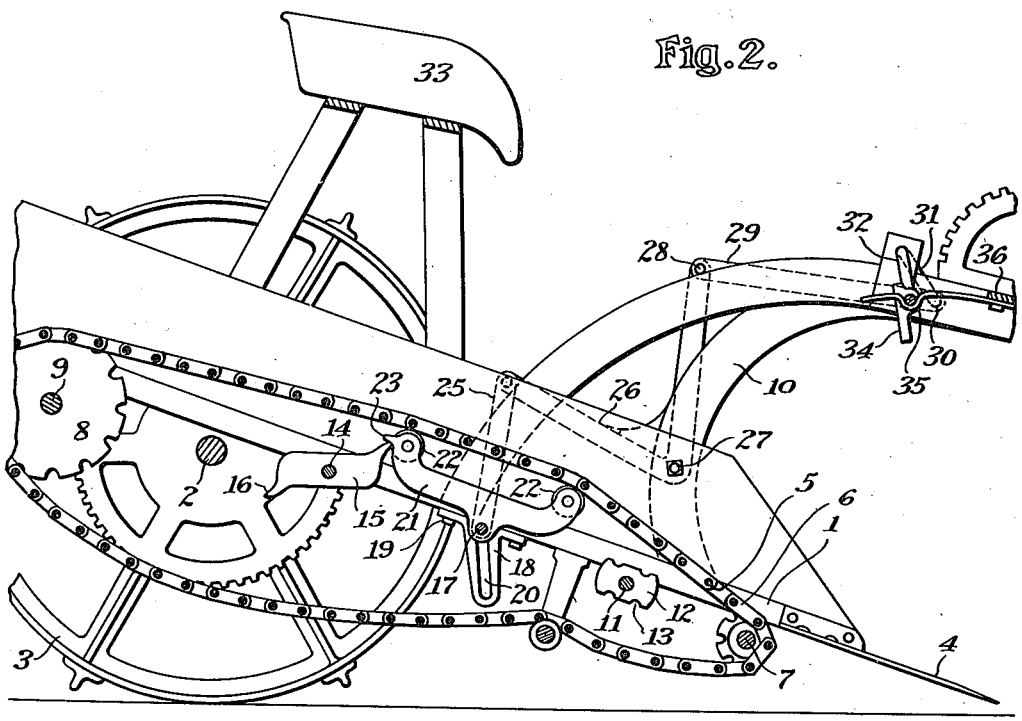
Fig. 2 is a view similar to Fig. 1, in which the machine is shown adjusted to render the agitation inactive.

A feature of this invention is the movement of the conveyer with reference to the agitating means, preferably by flexing the conveyer and causing the latter to travel in a path which is beyond the path of movement of the agitating devices, so that the latter will not be engaged by the conveyer. In this instance, this flexing and guiding means is arranged between the two agitating devices, so that a flexing of the conveyer at this point will carry the conveyer beyond the fields of operation of both of said agitating devices. Preferably this flexing and guiding means is in the form of a rod 17 supported by the side pieces 1, preferably for an up-and-down movement. In this instance, the side pieces 1 have two depending brackets 18 bolted to the under side thereof at 19, and provided with slots 20 in which the rod 17 works near opposite ends. Preferably, these slots or ways 20 have their lengths at angles other than right angles to the lengths of the side pieces, so that when the rod moves upwardly in the slots or ways 20 to flex the conveyer, said rod also tends to move slightly toward the axis of rotation of the agitating plates 15, for a purpose which will be hereinafter fully set forth. On the rod 17 are mounted two members 21 extending in opposite directions from said rod 17, and carrying at each end thereof a roller 22. When the rod 17 is in its lowermost position, these rollers have no effect on the endless conveyer, but with the movement of the rod 17 upwardly in the ways 20, the rollers 22 engage the links 6 and move a portion of the conveyer to carry such conveyer out of the paths of movement of the two agitating devices, so that the conveyer in its travel is not jarred or agitated by the agitating means. On the rear end of each of the members 21 a projection or lug 23 may be provided, the purpose of which is to engage with one of the projections 16 on one of the agitating plates 15 as shown in Fig. 2, for the purpose of preventing the turning of the rear agitating device after said device has been rendered inactive. The angular arrangement of the ways 20 permits this coöperation between this projection 23 and the projection 16.

Any suitable means may be employed for moving the guiding and flexing device. In this instance, links 25 are connected to the rod 17 near the ends of the latter, and to each of these links 25 one arm of one of the bell crank levers 26 is connected, the bell crank lever being pivoted at 27 to the side pieces 1, and having its other arm pivoted at 28 to a link 29. The latter extends forwardly and is pivoted at 30 to an arm 31 on a rock shaft 32 which is journaled in the braces 10, and extends transversely of the machine in front of the seat 33 for the driver. To this rock shaft 32 any suitable actuating means may be connected, as for instance, a foot piece 34 which may be engaged by the driver while upon the seat, for the purpose of throwing the cranked portion of the rock shaft 32 into coöperation with a spring latch 35 mounted on a cross piece 36 which connects the braces 10 in front of the rock shaft 32. The end of this latch 35 may also be engaged by the foot of the driver to release the rock shaft 32 from the latch.

Figure 3:
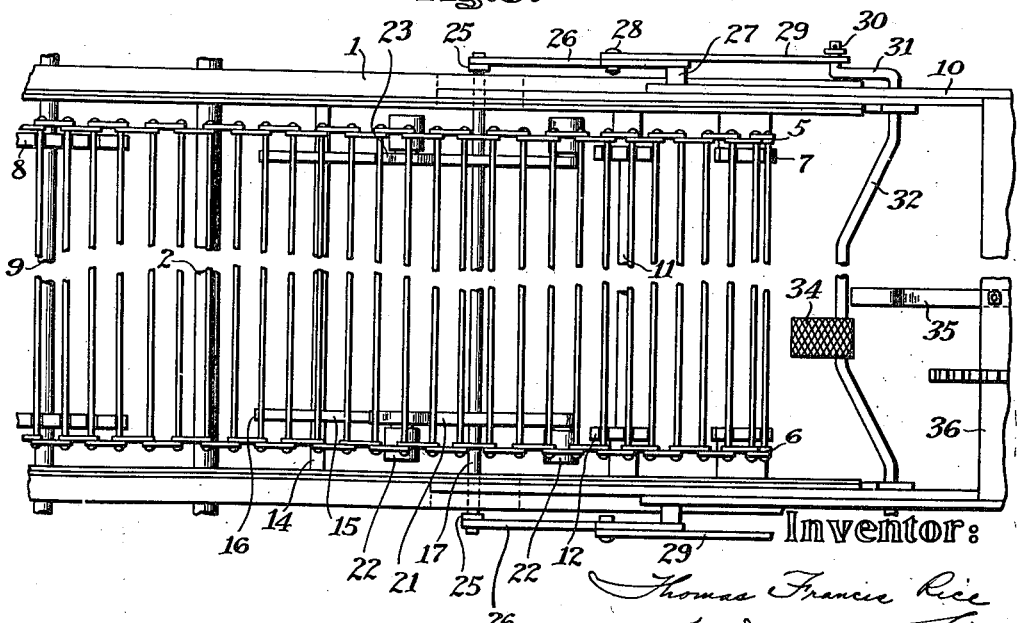
Fig. 3 is a plan view of a portion of the machine with the parts adjusted as shown in Fig. 1.

When agitation of the endless conveyer is desired, the machine is adjusted as shown in Figs. 1 and 3, so that the rollers 22 do not produce any action upon the endless conveyer, but the latter is subjected to an agitating action by the agitating plates 12 and 15. To render the agitating means inactive, the driver depresses the foot piece 34, causing the cranked portion of the rock shaft 32 to be engaged with the latch 35, thus lifting the rod 17 and carrying the rollers 22 into engagement with the endless conveyer, so that the latter is flexed, and is caused to travel in a path beyond the paths of movement of the agitating devices.

According to this invention, it is possible to produce agitation in the endless conveyer of a digger at will, without removing the agitating means from the machine as is now common in this art. The agitating means is not interfered with, but the flexible endless conveyer is guided on a line beyond the paths of movement of the agitating devices by flexing the conveyer through a means operating between the two devices.

What I claim as my invention and desire to secure by Letters Patent is:—

1. A digger comprising an endless conveyer, agitating means acting on the conveyer to jar the same, and means for shifting the path of movement of the conveyer beyond that of the agitating means to render the latter inactive.

2. A digger comprising an endless conveyer, means acting on the conveyer to jar the same in order to produce agitation of the material on the conveyer, and movable means engaging the conveyer to flex the latter and guide the same beyond the path of movement of the agitating means.

3. A digger comprising an endless conveyer, agitating means acting on the conveyer to jar the same, and movably mounted rollers for engaging the conveyer to move the latter out of the path of the agitating means.

4. A digger comprising a pair of side pieces, an endless conveyer operating between said side pieces, agitating means acting on the under side of the upper lap of the conveyer to jar the latter, and means for elevating the path of movement of the conveyer in proximity to the agitating means to carry the conveyer out of the path of operation of the agitating means.

5. In a digger, an endless conveyer, agitating means acting on the under side of the upper lap of the conveyer to jar the latter, means for elevating the path of movement of the conveyer in proximity to the agitating means to carry the conveyer out of the path of operation of the agitating means, said means comprising a rod guided for up-and-down movement, and two members supported by said rod, and each projecting from opposite sides thereof, said members having at each end thereof a roller for engaging the conveyer.

6. A structure as specified in claim 5, embodying means for shifting said rod, comprising a link pivotally connected to the rod, a bell crank lever, a link connected to said bell crank lever, and a rock shaft connected to the last named link.

7. A structure as specified in claim 5, embodying means for shifting said rod comprising two links connected to opposite ends of said rod, two bell crank levers each having one arm thereof connected to one of the links, two other links connected to the other arms of the bell crank levers, a rock shaft to which said links are eccentrically connected, said rock shaft having a cranked portion, and a latch for engaging said crank portion of the rock shaft to hold the rod in its uppermost position.

8. A digger comprising an endless conveyer, two agitating devices acting on the under side of the upper lap of the conveyer, and means operating between said devices to move the conveyer to a field of operation beyond the fields of operation of the agitating devices.

9. A digger comprising an endless conveyer, an agitating device for acting on the conveyer to jar the same, means for moving the endless conveyer out of the path of movement of the agitating device, and means for holding the agitating device against operation.

10. A structure as specified in claim 9 having said means for holding the agitating device effective when the endless conveyer is moved away from the agitating means.

11. A digger comprising an endless conveyer, a rotary agitating device operating on the under side of the upper lap of the conveyer, means for shifting the conveyer out of the path of operation of the rotary agitator, and means movable into the path of the rotary agitator to prevent the turning of the latter when the endless conveyer has been shifted beyond the field of operation of the agitator.

12. A structure as specified in claim 11 in which said means to prevent the turning of the rotary agitator comprises a portion on the conveyer shifting means engaging a portion on the rotary agitating device.

THOMAS FRANCIS RICE.